United States Patent [19]

Mose et al.

[11] Patent Number: 4,771,606
[45] Date of Patent: Sep. 20, 1988

[54] HELPER DRIVE APPARATUS FOR TURBINE DRIVE SYSTEM

[75] Inventors: Tadao Mose; Akio Hirata; Suzuo Saito; Teruo Nakagawa; Akihiko Kuroiwa, all of Tokyo, Japan

[73] Assignee: Kabushiki Kaisha Toshiba, Kawasaki, Japan

[21] Appl. No.: 87,525

[22] Filed: Aug. 20, 1987

[30] Foreign Application Priority Data

Aug. 25, 1986 [JP] Japan .............................. 61-197234
Nov. 11, 1986 [JP] Japan .............................. 61-266552

[51] Int. Cl.⁴ ............................................. F01B 21/04
[52] U.S. Cl. ........................................ 60/711; 60/706
[58] Field of Search .................. 60/706, 711; 290/4 R

[56] References Cited

U.S. PATENT DOCUMENTS

4,137,721  2/1979  Glennon et al. ...................... 60/711
4,580,402  4/1986  Firey ................................... 60/711
4,721,861  1/1988  Saito et al. ......................... 290/4 R

Primary Examiner—Allen M. Ostrager
Attorney, Agent, or Firm—Oblon, Fisher, Spivak, McClelland & Maier

[57] ABSTRACT

A helper drive apparatus for a turbine drive system in which a load is mainly driven by a turbine and a helper motor is used for assisting the drive for the load, comprising: a turbine control circuit, coupled to the turbine, for controlling output power of the turbine in accordance with a turbine power reference signal; a motor control circuit, coupled to the helper motor, for controlling output power of the helper motor in accordance with a motor power reference signal; a speed control means, coupled to the turbine, for detecting a difference between a given speed reference signal and a speed signal indicating an operation speed of the turbine, and providing a master power reference signal representing the difference; and a power sharing ratio control circuit, coupled to the speed control circuit, turbine control circuit, and motor control circuit, and being responsive to a given power sharing instruction signal, for sharing the master power reference signal to the turbine power reference signal and the motor power reference signal such that a ratio between the turbine power reference signal and the motor power reference signal depends on a value of the given power sharing instruction signal.

10 Claims, 7 Drawing Sheets

HELPER DRIVE APPARATUS FOR TURBINE DRIVE SYSTEM

BACKGROUND OF THE INVENTION

The present invention relates to a helper drive apparatus for a turbine, in which an AC motor is coupled with the turbine and a load is driven by both, at a desired power-sharing ratio.

In general, a large-scale compressor is driven at a constant speed by a steam turbine. If the capacity of such a compressor is increased, equipment of the turbine must be replaced by larger one.

Due to recent low electric power costs during nighttime, motor drive tends to be more economical than turbine drive during the nighttime operation.

For this reason, a helper motor system has been proposed. This system utilizes an AC motor, which is advantageous from the viewpoint of high-speed operation. This motor is coupled to a turbine, and its output is controlled, by means of a power converter, so as to remain at a predetermined value. Thus, the load driven by the turbine is shared partially with the AC motor.

With the helper motor system, the turbine is subjected to speed control, based on a speed reference, by a mechanical governor, while the AC motor is subjected to power control based on a power reference.

This being so, the shaft speed of the turbine, the load machine, and the AC motor, respectively, are controlled by the speed control of the turbine, while power is supplied to the AC motor in accordance with the power reference set separately from the speed reference. Therefore, if the relationship between the speed references of the turbine and motor is not managed with due care, the system will likely break down.

For example, if the speed reference of the turbine is decreased while the power reference of the AC motor remains constant, power to be supplied to the load may become transiently short. Further, when an operation is to be performed steadily at a point of maximum economy or of highest efficiency, the optimal point must then be re-adjusted in accordance with the current operating condition of the load machine. Such an adjustment is cumbersome and time-consuming.

Since, in the case of the conventional helper motor system, the turbine system includes the mechanical operation, the system's control response is slow. Consequently, the response of the turbine, with respect to output, is slow when an abrupt change in load occurs, resulting in a large variation in the speed of the turbine shaft. When the speed control of such a system is performed by a motor system, no mechanical operation is involved, and thus, a quick response can be obtained. However, this system requires the use of a special motor having an output capacity which can cover a wide range of variations in load over a long period of time. Thus, the conventional helper motor system is disadvantageous in terms of practical equipment investment.

SUMMARY OF THE INVENTION

It is a primary object of the present invention to provide a helper drive apparatus for a turbine which can perform speed control for the overall system of the helper drive apparatus, and can optimally control the power shares of the turbine and an AC motor.

It is another object of the present invention to provide a helper motor system in which a transient shortage of turbine output power can be compensated for by a motor having a relatively small capacity as compared to the turbine output power, so that a quick control response can be achieved for the overall system of the helper motor.

In order to achieve the primary object, there is provided a helper drive apparatus for a turbine, in which an AC motor is coupled to a turbine and a load machine of the turbine is driven by the AC motor serving as a helper, comprising a speed control circuit (43) for controlling a speed of a turbine drive system, a load distribution circuit (45) for controlling load shares of the turbine (11) and the AC motor (12), and control circuits (21, 31) for controlling the power of the turbine and the power of the AC motor in accordance with distributed load shares (R1, R2) from the load distribution circuit (45), whereby optimal load sharing, according to the machine ratings and operating conditions, can be achieved.

In order to achieve another object of the present invention described above, there is provided a helper motor system comprising means (28x, 40x) for detecting (or predicting) a shortage in power supplied to a load (13), caused by a delayed response of a turbine system (11, 21x, 22, 24) to a transient variation in demand of a load or an object to be driven, and means (31x, 32) for controlling a motor system (12) so as to compensate for the shortage of power supply in accordance with an output signal (DTRU, I) from the detecting (or predicting) means (28x, 40x).

In the system with the above arrangement, a shortage of power supply to the load, due to the delayed response of the turbine system to a transient variation in the load, is detected (or predicted), and a detection (or prediction) signal (DTRU, I) is input to a control circuit for the motor system. Thus, the detection (or prediction) signal (DTRU, I) is added to an output reference (PREF) of the motor system, thereby compensating for the shortage of the power supply to the load by the motor system.

DETAILED DESCRIPTION OF THE PREFERRED EMBODIMENTS

The embodiments of the present invention will be described below with reference to the accompanying drawings. In these drawings, functionally equivalent elements are denoted by the same reference numerals in order to avoid redundant explanations.

Figure 1:
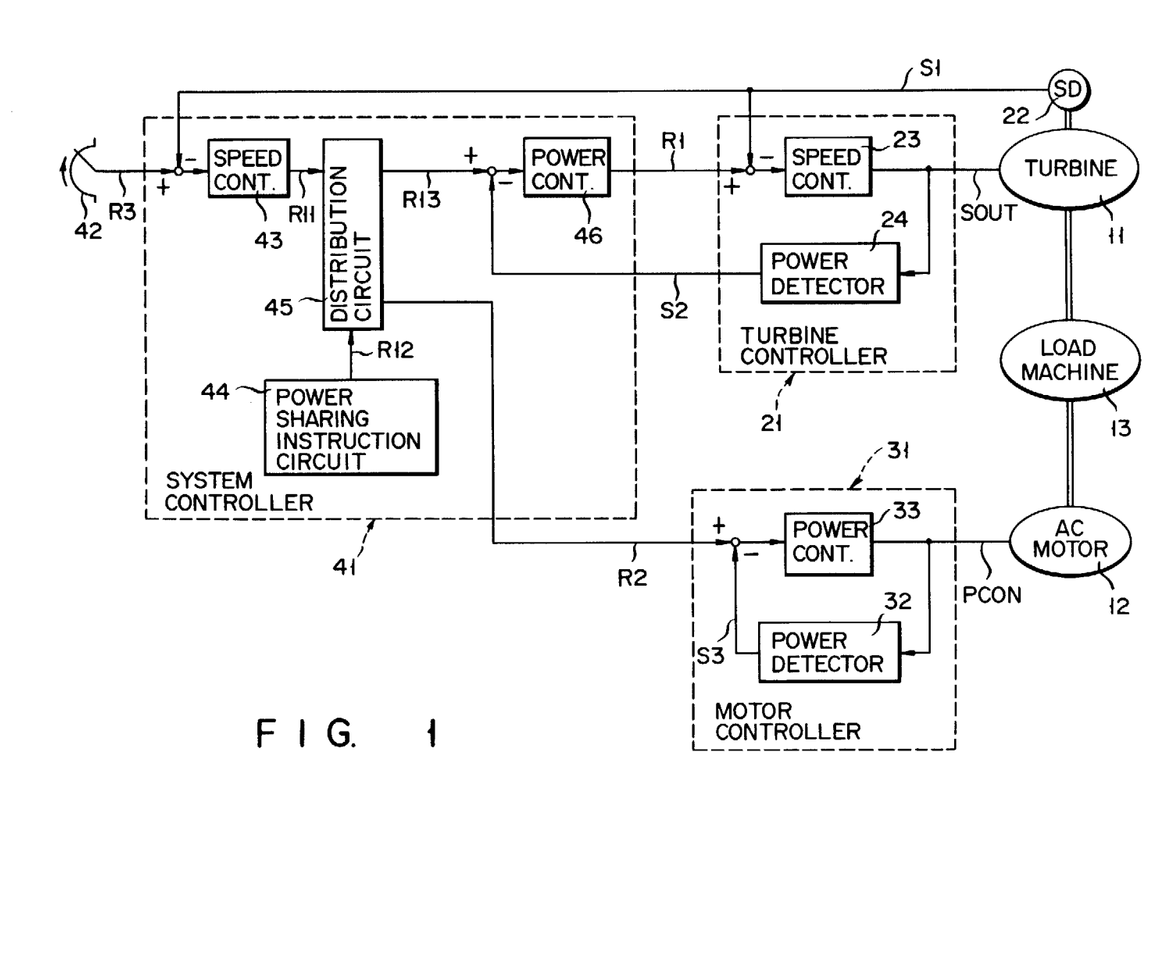
FIG. 1 is a block diagram showing the overall arrangement according to an embodiment of the present invention.

FIG. 1 is a block diagram showing the overall arrangement of an embodiment according to the present invention.

Referring to FIG. 1, turbine 11, load machine 13, and AC motor 12 are tandem-connected, and speed detector (tachometer) 22 is coupled to the rotating shaft of turbine 11.

Turbine 11 is controlled by output SOUT from turbine controller 21 which comprises speed controller 23 and power detector 24. Controller 23 compares speed feedback signal S1 from detector 22 with turbine speed reference signal R1, and amplifies the result of comparison to provide output SOUT for controlling the rotating speed of turbine 11. Detector 24 can be formed of a pressure gauge for measuring the steam pressure of turbine 11 to convert the measured steam pressure to turbine power feedback signal S2.

AC motor 12 is controlled by output PCON from motor controller 31 which comprises power controller 33 and power detector 32. Detector 32 can be formed of a voltage detector (not shown) for detecting the voltage applied to motor 12, and a current detector (not shown) for detecting a current flowing into motor 12 and having a phase being matched with the phase of the voltage applied to motor 12. Detector 32 multiples the detected voltage from the voltage detector by the detected current from the current detector, and generates motor power feedback signal S3. Controller 33 compares power feedback signal S3 from detector 32 with motor power reference signal R2, and amplifies the result of comparison to provide output PCON for controlling the output power of motor 12.

Speed reference signal R1 and power reference signal R2 are delivered from system controller 41. Controller 41 comprises speed controller 43, power sharing instruction circuit 44, distribution circuit 45, and power controller 46.

Speed controller 43 compares speed feedback signal S1 with master speed reference signal R3 obtained from speed setting deice 42, and amplifies the result of the comparison to provide master power reference signal R11 which determines the overall power of the turbine/helper motor system.

Distribution circuit 45 is responsive to master power reference signal R11 and power sharing instruction signal R12 from circuit 44. Circuit 44 can be a simple deice as is shown by 44A in FIG. 5. According to the value of instruction signal R12, circuit 45 distributes the value of reference signal R11 to turbine power reference signal R13 and motor power reference signal R2.

Controller 46 compares turbine power feedback signal S2 with turbine power reference signal R13, and amplifies the result of the comparison to provide turbine speed reference signal R1.

Figure 2:
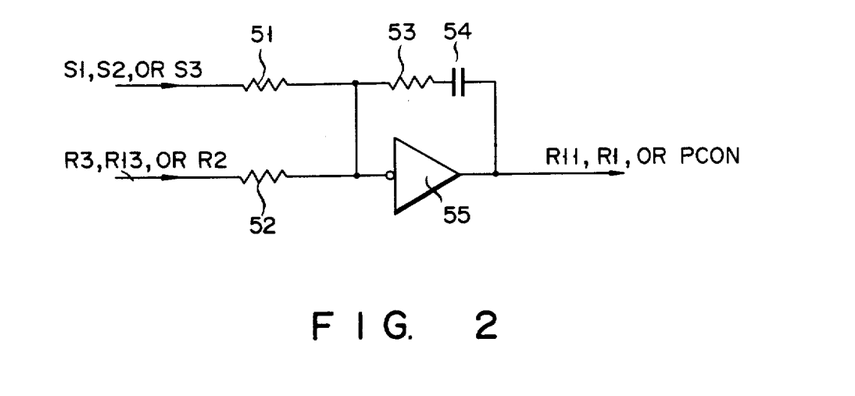
FIG. 2 is an example of a speed controller (43) and power controllers (33, 46) shown in FIG. 1.

Each of controllers, 43, 46, and 33 can be constituted by the circuit of FIG. 2. Signal S2 (or S2, S3) is supplied to the inverting input of amplifier 55, via resistor 51. Signal R3 (or R13, R2) is supplied to this inverting input via resistor 52. The output of amplifier 55 is coupled to the inverting input thereof, via a series circuit of resistor 53 and capacitor 54. Signal R11 (or R1, PCON) is delivered from the output of amplifier 55.

Figure 3:
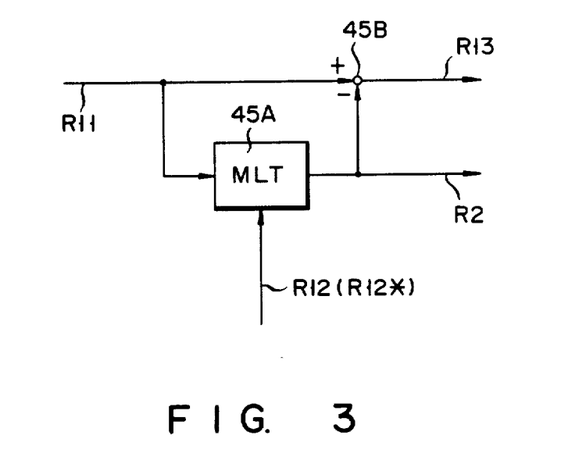
FIG. 3 is an example of a distribution circuit (45) shown in FIG. 1.

Distribution circuit 45 can be constituted by the circuit of FIG. 3. Multiplier 45A multiplies signal R11 by signal R12 to provide signal R2. Subtracter 45B subtracts signal R2 from signal R11 to provide signal R13.

According to the circuit configuration of FIG. 1, the overall speed control of the turbine/helper motor system is performed by speed controller 43 based on master speed reference signal R3, and master power reference signal R11 is obtained from controller 43. Once the overall power of the turbine/helper motor system is determined, the value of signal R11 is correspondingly determined. In this case, when the power sharing between turbine 11 and motor 12 is fixed at a constant ratio, even if the rated capacities of turbine 11 and motor 12 are greatly different from each other, turbine 11 and motor 12 can be operated at proper power ratios corresponding to their rated capacities. In other words, even if the capacity of each of turbine 11 and motor 12 has certain upper and lower limits, they can be cooperated during a normal operation of the turbine/helper motor system, without subjected to these upper and lower limits.

Figure 4:
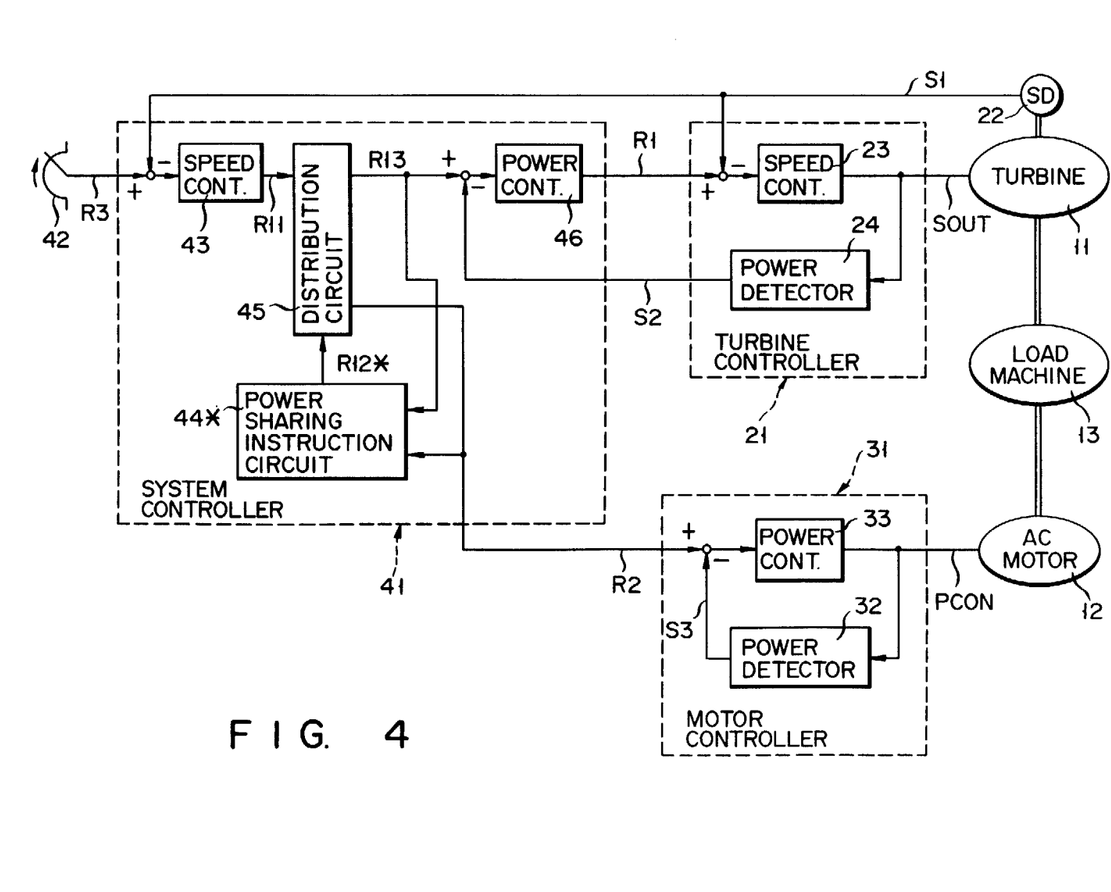
FIG. 4 is a block diagram showing a modification of the embodiment of FIG. 1.

FIG. 4 is a block diagram showing a modification of the embodiment of FIG. 1. Power sharing instruction circuit 44* of FIG. 4 differs from circuit 44 of FIG. 1 in that circuit 44* generates power sharing instruction signal R12* which indicates an optimal sharing ratio depending on various operating parameters of the turbine/helper motor system.

Figure 5:
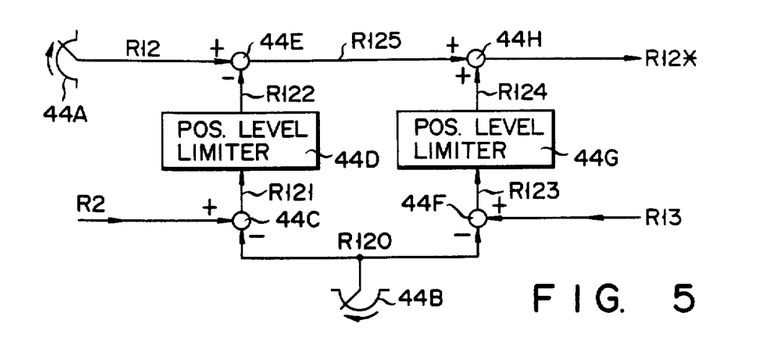
FIG. 5 is an example of a power sharing instruction circuit (44) shown in FIG. 1.

FIG. 5 is an example of a power sharing instruction circuit (44) shown in FIG. 1. In FIG. 5, setting device 44A provides signal R12 for setting a power sharing ratio of the turbine/helper motor system. This sharing ratio is proportional to the ratio between the given ratings of turbine 11 and motor 12. Setting device 44B provides signal R120 for setting the minimum power of each of turbine 11 and motor 12. Signal R120 is subtracted from signal R2 at subtracter 44C to provide signal R121. Signal R120 is also subtracted from signal R13 at subtracter 44F to provide signal R123.

Figure 5A:
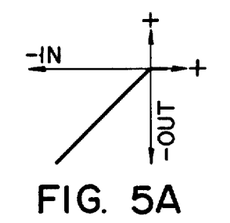
FIG. 5A is an exemplified input/output characteristic of each positive limiter (44D, 44G) shown in FIG. 5.

Signals R121 and R123 are supplied to positive level limiters 44D and 44G, respectively. Each of limiters 44D and 44G has an input/output characteristic as is shown in FIG. 5A. Thus, when the level of signal R121 (R123) is positive, no output (i.e., zero level output) is obtained from limiter 44D (44G). However, when the level of signal R121 (R123) is negative, negative signal R122 (R124) having a level proportional to the negative level of signal R121 (R123) is output from limiter 44D (44G).

Signal R122 is subtracted from signal R12 at subtracter 44E. Resultant output R125 from subtracter 44E is added to signal R124 at adder 44H which them provides power sharing instruction signal R12*.

With the circuit as shown in FIG. 5, when turbine power reference signal R13 is decreased below a predetermined value defined by signal R120, signal R124 having a negative value proportional to the difference between signals R13 and R120 is subtracted from output R125, so that signal R13 is controlled to be decreased no more. Similarly, if motor power reference signal R2 is decreased below the predetermined value (R120), signal R122 having a negative value proportional to the difference between signals R2 and R120 is added to signal R12, so that signal R2 is controlled to be decreased no more.

In this manner, the minimum power of turbine 11 and motor 12, defined by signal R120, can be maintained, thereby eliminating problems caused by a system operation below the minimum power of turbine 11 and motor 12, and obtaining stable system operation.

Figure 6:
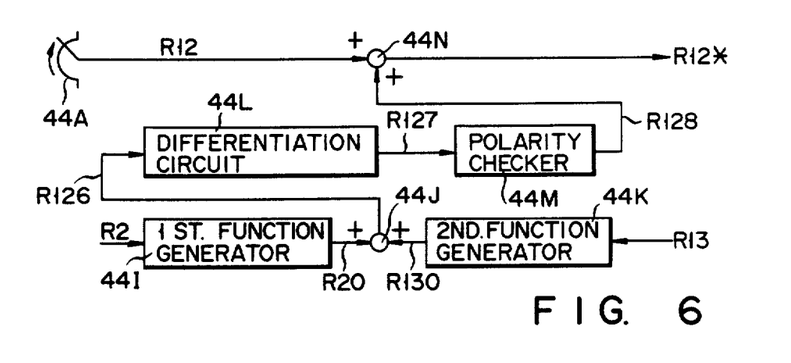
FIG. 6 is another example of a power sharing instruction circuit (44) shown in FIG. 1.
Figure 7A:
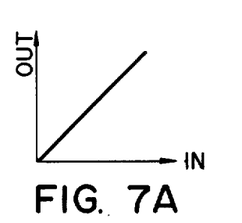
FIGS. 7A to 7D are exemplified input/output characteristics of first or second function generator (44I, 44K) shown in FIG. 6.
Figure 7B:
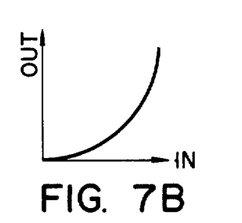
Figure 7C:
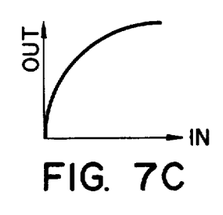
Figure 7D:
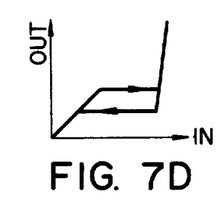

FIG. 6 is another example of a power sharing instruction circuit (44) shown in FIG. 1. In FIG. 6, motor power reference signal R2 is converted into modified motor power reference signal R20, via first function generator 44I. Turbine power reference signal R13 is also converted into modified turbine power reference signal R130, via second function generator 44K. Signal R20 represents the cost of electric power of motor 12, while signal R130 represents the fuel cost of turbine 11.

Each of generators 44I and 44K can be formed a series circuit of an analog-to-digital converter responsive to signal R2 or R13, a ROM containing data of a function as shown in any one of FIGS. 7A to 7D, and a digital-to-analog converter providing signal R20 or R130. More specifically, the signal level of R2 (or R13) designates the address of the ROM for reading out R20 (or R130).

Signal R20 is added to signal R130 at adder 44J to provide new power reference signal R126. Signal R126 represents the total cost of the electric power of motor 12 and the fuel of turbine 11. Signal R126 is differentiated at differentiation circuit 44L. Circuit 44L differentiates the level change of signal R126, and provides differentiated signal R127. When signal R126 is incremented with time, differentiated signal R127 has a positive value. On the other hand, when signal R126 is decremented with time, differentiated signal R127 has a negative value.

Signal R127 is supplied to polarity checker 44M. The level of output R128 from checker 44M changes from logic "1" to logic "0" when signal R126 is incremented and signal R127 has a positive value, while the level of output R128 changes from logic "0" to logic "1" when signal R126 is decremented and signal R127 has a negative value. Thus, the level change point of output R128 from logic "0" to logic "1" indicates the maximum point of the level of signal R126. In other word, the level change point of output R128 from logic "0" to logic "1" indicates the maximum total cost point of the motor electric power and the turbine fuel. This logic level "1" of output R128 is held at checker 44M and is added to power sharing instruction signal R12 at adder 44N. Then, power sharing instruction signal R12* is obtained from adder 44N.

In summary, circuit 44L receives total cost data (R126) of the motor electric power and the turbine fuel, and discriminates how the current total cost has changed from the immediately preceding cost. Checker 44M then generates an instruction (R128) to modify the value of signal R12*, so that a power sharing ratio (R13/R2) is changed by a minimum increment ($\Delta P$).

For instance, when the power sharing ratio (R13/R2) is increased by $\Delta P$, and if the total cost of the motor electric power and the turbine fuel is decreased, then the power sharing ratio (R13/R2) is further increased by $\Delta P$, and the same procedures of increasing $\Delta P$ is repeated. If the decrease of the total cost is stopped and a point at which the total cost is increased is reached, this point is detected by the logic level change of signal R128. After the detection of this point, the power sharing ratio (R13/R2) is repeatedly decreased by $\Delta P$ until the increase of the total cost is stopped and a point at which the total cost is decreased is reached.

As mentioned above, the circuit of FIG. 6 continues its operation so that the power sharing ratio (R13/R2) is maintained at a point of minimum total cost of the motor electric power and the turbine fuel.

Incidentally, how the power sharing ratio (R13/R2) is changed by the control operation of FIG. 6 depends on which characteristic of FIGS. 7A to 7D is applied to function generators 44I and/or 44K. Further, signals R20 and/or R130 may represent input energy for motor 12 and/or turbine 11.

According to the embodiments (FIGS. 1 to 7) of the present invention as described above, the speed control system for the entire system is arranged, and the power shares of the turbine and the AC motor can be controlled. Therefore, the following effects can be obtained.

(1) Power shares substantially proportional to respective equipment (turbine, motor) ratings can be set, and a stable operation can be assured regardless of power limits of the system.

(2) Since the minimum powers of the turbine and the AC motor can be assures, the operation can be continued even during a system unstable state, e.g., surging.

(3) Power sharing can be achieved, so that the operating cost of the system can be minimized, and the system efficiency can be maximized, thus providing economical advantages.

(4) Since an existing system can be utilized as a control system for the turbine, a practical system configuration can be realized.

Another embodiment of the present invention will now be described with reference to the accompanying drawings.

Figure 8:
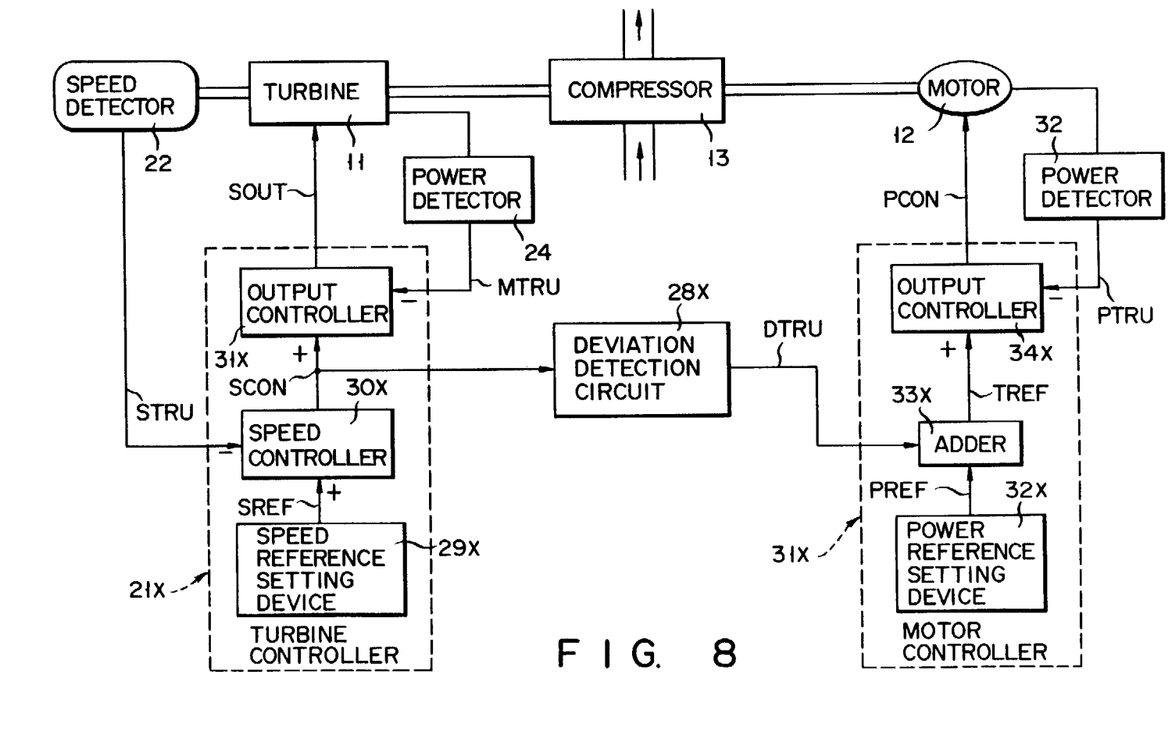
FIG. 8 is a block diagram showing the overall arrangement of another embodiment according to the present invention.

As shown in FIG. 8, a helper motor system according to another embodiment of the present invention comprises turbine 11, motor 12 arranged parallel to turbine 11, compressor 13 as a load driven by turbine 11 and motor 12, speed detector 22 for detecting a rotational speed of turbine 11, power detector 24 for detecting an output power of turbine 11, power detector 32 for detecting an output power of motor 12, turbine controller 21x for controlling turbine 11, motor controller 31x for controlling motor 12, and deviation detection circuit 28x for detecting a shortage in power supply of turbine 11 with respect to a variation in load.

The configurations of detectors 24 and 32 in FIG. 8 can be the same as those of detectors 24 and 32 in FIG. 1. Further, deviation detection circuit 28x can be simply constituted by a device for converting a mechanical value (SCON), e.g., a steam pressure, into an electrical value (DTRU), e.g., a voltage or current. A pressure-sensitive semiconductor device can be used for such a converting device, for example.

Incidentally, elements 11, 22, 24, and 21x are mechanically constructed. Such a mechanical turbine control system is well known by, for example, Sinzou SHIBAYAMA, "Steam Motor I",
Heat Engine System No. 8 (Apr. 1, 1957)
Sankai-dō Japan
pp. 202-220

Turbine controller 21x comprises speed reference setting device 29x for setting a speed reference (SREF) of turbine 20x, speed controller 30x for controlling the speed of turbine 11 based on output signal SREF from setting device 29x and detection signal STRU from speed detector 22, and output controller 31x for controlling the output power from turbine 11 based on the output signal (SCON, MTRU) from controller 30x and detector 24.

Motor controller 31x comprises power reference setting device 32x for setting a power reference (PREF) of motor 12, adder 33x for adding output signal PREF from setting device 32x and output signal DTRU from deviation detection circuit 28x, and output controller 34x for controlling the output power from motor 12 based on output signal TREF from adder 33x.

In the helper motor system with the above arrangement, a shortage in power supply to compressor 13, due to a delayed response of the mechanical turbine control system with respect to a variation in load (13), is detected by deviation detection circuit 28x, and detection signal DTRU is supplied to the motor control system (31x). This operation will be described with reference to FIGS. 9A-9D.

Referring to FIGS. 9A-9D, reference symbol PL denotes the magnitude of load 13; PT, a turbine output power; PM, a motor output power; and ω, a rotational speed of the turbine shaft.

Figure 9A:
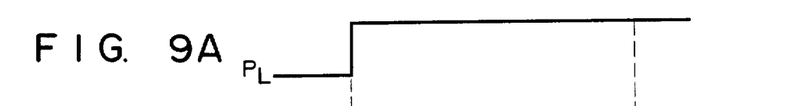
FIGS. 9A to 9D are timing charts for explaining an operation of the embodiment shown in FIG. 8.
Figures 9B, 9C:
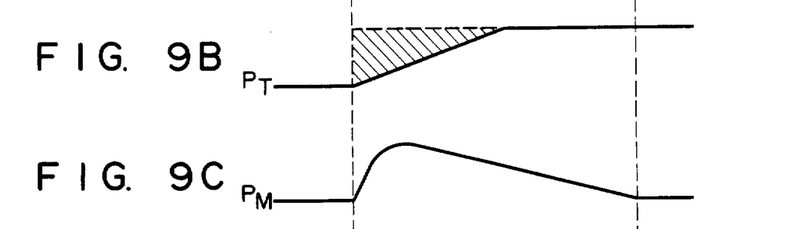
Figure 9D:
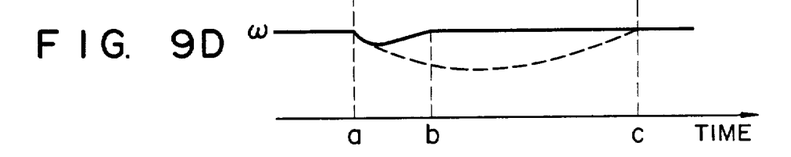

When magnitude PL of load 13 is abruptly increased at time a (FIG. 9A), a shortage of turbine output PT indicated by the hatched region (FIG. 9B), i.e., a portion of turbine output PT that cannot be responded by the mechanical turbine control system (21x), is detected via deviation detection circuit 28x. The shortage of turbine output PT is responded by output PCON from the motor control system (31x), so that motor output PM is increased (FIG. 9C). By the increase in motor output PM, the decrease in rotational speed ω of turbine 11 is compensated for, and speed ω is recovered at time b (FIG. 9D) in response to the shortage of turbine output PT (the hatched portion of FIG. 9B). If speed ω is not compensated for by the transient increase in output PM, the recovery of speed ω will be delayed to time c as is indicated by the broken line in FIG. 9D.

Figure 10:
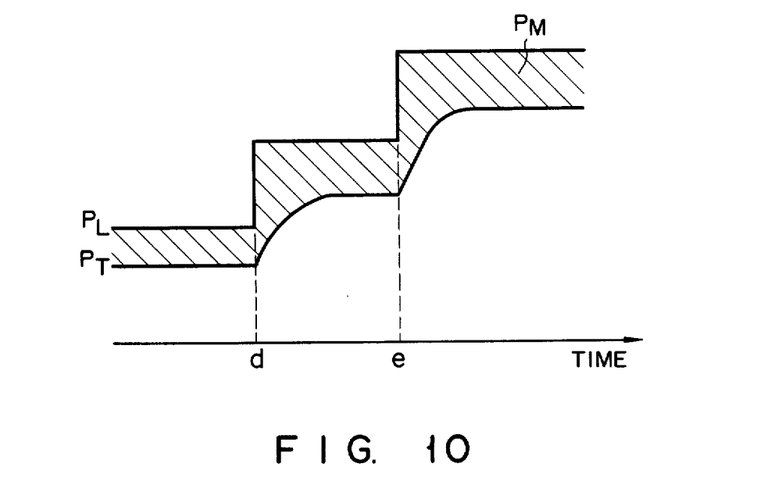
FIG. 10 is a timing chart for explaining another operation of the embodiment shown in FIG. 8.

When magnitude PL of load 13 is stepwisely increased as is shown in FIG. 10, the helper motor system of FIG. 8 will operate as follows.

The entire system of FIG. 8 is controlled such that motor output PM indicated by the hatched region in FIG. 10 transiently responds to the abrupt change in magnitude PL of load 13 at times d and e, while turbine output PT steadily responds to this abrupt change with certain time delay. Thus, when the variation in load 13 is to be coped with for a long period of time, the capacity of motor output PM need only be controlled to satisfy a preset value, corresponding the parallel part of PL and PT in FIG. 10, and a transient value, corresponding to the non-parallel part of PL and PT in FIG. 10.

Figure 11:
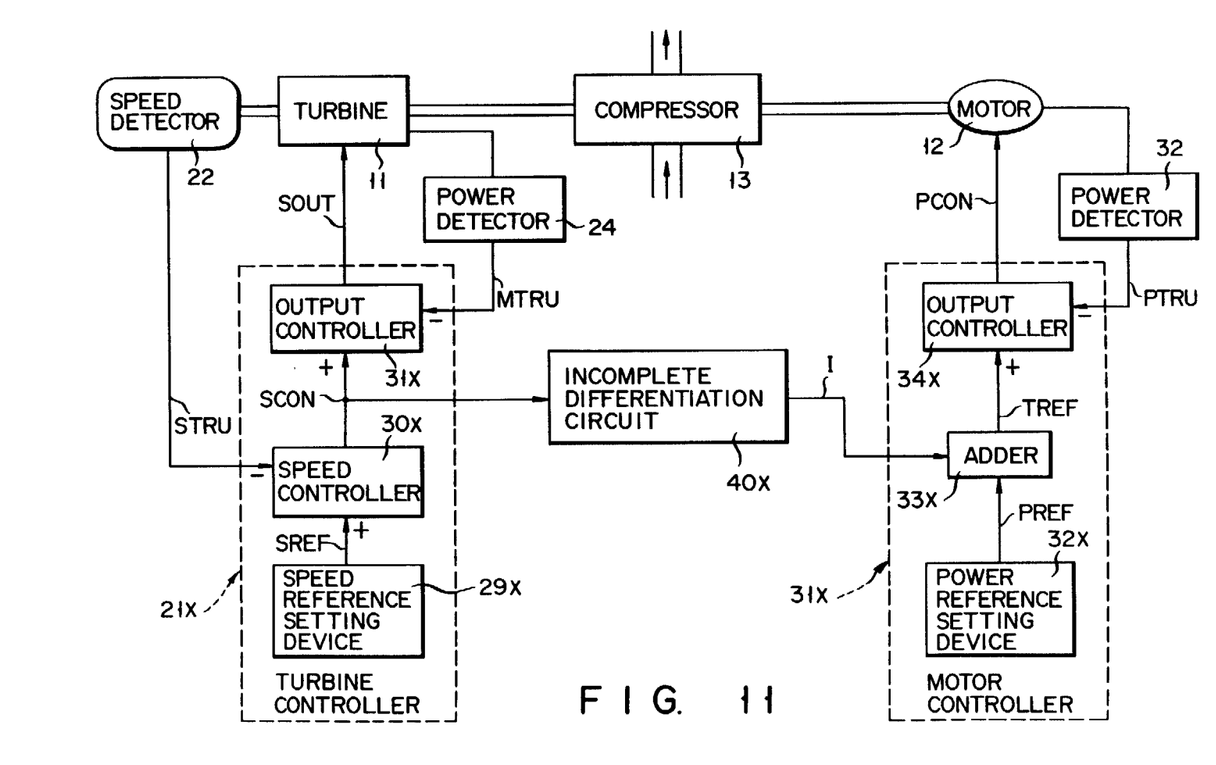
FIG. 11 is a modification of the embodiment shown in FIG. 8.

FIG. 11 is a modification of the embodiment shown in FIG. 8. In the embodiment of FIG. 11, deviation detection circuit 28x of FIG. 8 is replaced with incomplete differentiation circuit 40x. A combination of a conventional mechanical/electrical converter and a conventional CR high-pass filter circuit with a proper amplifier, having a frequency response characteristic of, e.g., −6 dB/oct. to −18 dB/oct., can be used for constituting incomplete differentiation circuit 40x.

Circuit 40x differentiates an electrically converted signal of a steam pressure (SCON) in turbine controller 21x, and provides differentiated signal I. Signal I indicates the rate of change in the shaft rotating speed of turbine 11 (or in the steam pressure of turbine 11). Thus, how the turbine speed (e.g., ω in FIG. 9D) or the turbine power (e.g., PT in FIG. 10) will be changed, or how a transient shortage in output power of turbine 11 will occur, can be roughly predicted from how signal I changes. In the arrangement of FIG. 11, drive power PCON for motor 12 is controlled to be based on signal I in the same manner as in the arrangement of FIG. 8.

According to the embodiments of FIGS. 8 and 11, when the power supply to load 13 is changed due to a transient load variation, a shortage in the load power supply due to a delayed response of the turbine control system (21x) is detected (or predicted), and the detected (or predicted) shortage value is added to the output power reference value (PREF) of the motor control system (31x), so that the shortage in the load power supply is compensated for by the operation of the motor control system (31x). Thus, a transient shortage in output power of turbine 11 can be compensated for by motor 12 having relatively small output capacity, and a helper motor system having a fast control response speed can be obtained.

Incidentally, there is U.S. patent application Ser. No. 943,776 filed on Dec. 19, 1986, titled "Turbine Helper Drive Apparatus" (S. Saito et al.), disclosing relevant art of the present invention. All disclosures of this U.S. patent application are now incorporated in the present patent application.

While the invention has been described in connection with what is presently considered to be the most practical and preferred embodiments, it is understood that the invention should not be limited to the disclosed embodiments but, on the contrary, is intended to cover various modifications and/or equivalent arrangements included within the scope of the appended claims which scope is to be accorded the broadest interpretation so as to encompass all such modifications and equivalent arrangements.

What is claimed is:

1. A helper drive apparatus for a turbine drive system in which a load is mainly driven by a turbine and a helper motor is used for assisting the drive for the load, comprising:

turbine control means, coupled to said turbine, for controlling output power of said turbine in accordance with a turbine power reference signal;

motor control means, coupled to said helper motor, for controlling output power of said helper motor in accordance with a motor power reference signal;

speed control means, coupled to said turbine, for detecting a difference between a given speed reference signal and a speed signal indicating an operation speed of said turbine, and providing a master power reference signal representing said difference; and power sharing ratio control means, coupled to said speed control means, turbine control means, and motor control means, and being responsive to a given power sharing instruction signal, for sharing said master power reference signal to said turbine power reference signal and said motor power reference signal such that a ratio between said turbine power reference signal and said motor power reference signal depends on a value of said given power sharing instruction signal.

2. A helper drive apparatus according to claim 1, further comprising instruction means for providing said given power sharing instruction signal, said instruction means including:

a minimum power setting device for providing minimum power setting signal; and first signal control means, coupled to said minimum power setting device and said power sharing ratio control means, for controlling said given power sharing instruction signal such that when said motor power reference signal becomes less than said minimum power setting signal, said given power sharing instruction signal increases, and when said motor power reference signal becomes larger than said minimum power setting signal, said given power sharing instruction signal is free of said motor power reference signal.

3. A helper drive apparatus according to claim 2, wherein said instruction means further includes:

second signal control means, coupled to said minimum power setting device and said first signal control means, for controlling said given power sharing instruction signal such that when said turbine power reference signal becomes less than said minimum power setting signal, said given power sharing instruction signal decreases, and when said turbine power reference signal becomes larger than said minimum power setting signal, said given power sharing instruction signal is free of said turbine power reference signal.

4. A helper drive apparatus according to claim 1, further comprising instruction means for providing said given power sharing instruction signal, said instruction means including:

first function means, coupled to said power sharing ratio control means, for converting said motor power reference signal by a given first function into a first power reference signal;

second function means, coupled to said power sharing ratio control means, for converting said turbine power reference signal by a given second function into a second power reference signal;

differentiation means, coupled to said first and second function means, for differentiating a sum signal of said first and second power reference signals with respect to time, and providing a detection signal representing a rate of change in said sum signal; and signal control means, coupled to said differentiation means and said power sharing ratio control means, for detecting a polarity of said detection signal, and controlling said given power sharing instruction signal such that said given power sharing instruction signal is kept at a value obtained when the polarity of said detection signal changes.

5. A helper drive apparatus according to claim 1, wherein said power sharing ratio control means includes:

first circuit means for modifying said master power reference signal by said given power sharing instruction signal to provide said motor power reference signal; and second circuit means, coupled to said first circuit means, for combining said motor power reference signal with said master power reference signal to provide said turbine power reference signal.

6. A helper drive apparatus according to claim 1, wherein said power signal sharing ratio control means includes:

multiplier means for multiplying said master power reference signal by said given power sharing instruction signal to provide said motor power reference signal; and subtracter means for subtracting said motor power reference signal from said master power reference signal to provide said turbine power reference signal.

7. A helper drive apparatus according to claim 1, wherein said turbine control means includes:

turbine power detector means for detecting power supplied to said turbine and providing a turbine power detection signal;

turbine power control means, coupled to said turbine power detector means and said power sharing ratio control means, for detecting a first difference between said turbine power detection signal and said turbine power reference signal, and providing a turbine speed reference signal representing said first difference; and turbine speed control means, coupled to said turbine power control means and said speed control means, for detecting a second difference between said speed signal and said turbine speed reference signal, and generating the power supplied to said turbine in accordance with said second difference.

8. A helper drive apparatus according to claim 1, wherein said motor control means includes:

motor power detector means for detecting power supplied to said motor and providing a motor power detection signal; and motor speed control means, coupled to said motor power detector means, for detecting a difference between said motor power detection signal and said motor power reference signal, and generating the power supplied to said motor in accordance with said difference.

9. A helper drive apparatus for a turbine drive system in which a load is mainly driven by a turbine and a helper motor is used for assisting the drive for the load, comprising:

turbine control means, coupled to said turbine, for mechanically controlling output power of said turbine in accordance with a mechanical turbine power reference;

converter means, coupled to said turbine control means, for converting said mechanical turbine power reference into an electrical turbine power reference;

motor power reference setting means for providing a first motor power reference;

adder means, coupled to said converter means and said motor power reference setting means, for adding said electrical turbine power reference to said first motor power reference, and providing a second motor power reference; and motor control means, coupled to said adder means and said helper motor, for controlling output power of said helper motor in accordance with said second motor power reference.

10. A helper drive apparatus for a turbine drive system in which a load is mainly driven by a turbine and a helper motor is used for assisting the drive for the load, comprising:

turbine control means, coupled to said turbine, for mechanically controlling output power of said turbine in accordance with a mechanical turbine power reference;

circuit means, coupled to said turbine control means, for converting said mechanical turbine power reference into an electrical signal, and differentiating the electrical signal with respect to time to provide a differentiated signal;

motor power reference setting means for providing a first motor power reference;

adder means, coupled to said circuit means and said motor power reference setting means, for adding said differentiated signal to said first motor power reference, and providing a second motor power reference; and motor control means, coupled to said adder means and said helper motor, for controlling output power of said helper motor in accordance with said second motor power reference.

* * * * *